United States Patent
Lin et al.

(10) Patent No.: US 11,267,129 B2
(45) Date of Patent: Mar. 8, 2022

(54) AUTOMATIC POSITIONING METHOD AND AUTOMATIC CONTROL DEVICE

(71) Applicant: Metal Industries Research & Development Centre, Kaohsiung (TW)

(72) Inventors: Shi-Wei Lin, Kaohsiung (TW); Chun-Ming Yang, Kaohsiung (TW); Fu-I Chou, Kaohsiung (TW); Wan-Shan Yin, Changhua County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 273 days.

(21) Appl. No.: 16/699,101

(22) Filed: Nov. 28, 2019

(65) Prior Publication Data
US 2020/0171668 A1    Jun. 4, 2020

(30) Foreign Application Priority Data

Nov. 30, 2018   (TW) ................................ 107143046

(51) Int. Cl.
*B25J 9/16*         (2006.01)
*B25J 19/02*        (2006.01)

(52) U.S. Cl.
CPC .......... *B25J 9/1697* (2013.01); *B25J 9/1602* (2013.01); *B25J 19/021* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 8,065,060 B2 * | 11/2011 | Danko | ................... | B25J 9/1628 701/50 |
| 9,102,055 B1 * | 8/2015 | Konolige | .................. | G06T 7/13 |
| 9,193,073 B1 * | 11/2015 | Huang | ................... | B25J 9/1692 |
| 11,027,428 B2 * | 6/2021 | Nishitani | ................ | G06F 30/20 |
| 2006/0188250 A1 * | 8/2006 | Takeda | ................... | B25J 19/023 396/544 |

(Continued)

FOREIGN PATENT DOCUMENTS

CN    103153553    6/2013
CN    104511900    12/2017

(Continued)

*Primary Examiner* — Jonathan L Sample
(74) *Attorney, Agent, or Firm* — JCIPRNET

(57) ABSTRACT

An automatic positioning method and an automatic control device are provided. The automatic control device includes a processing unit, a memory unit, and a camera unit to automatically control a robotic arm. When the processing unit executes a positioning procedure, the camera unit obtains a first image of the robotic arm. The processing unit analyzes the first image to establish a three-dimensional working environment model and obtains first spatial positioning data. The processing unit controls the robotic arm to move a plurality of times to sequentially obtain a plurality of second images of the robotic arm by the camera unit and analyzes the second images and encoder information of the robotic arm to obtain second spatial positioning data. The processing unit determines whether an error parameter between the first spatial positioning data and the second spatial positioning data is less than a specification value to end the positioning procedure.

18 Claims, 3 Drawing Sheets

(56) References Cited

U.S. PATENT DOCUMENTS

| | | | |
|---|---|---|---|
| 2007/0147707 A1* | 6/2007 | Coste-Maniere | G06T 7/60 382/298 |
| 2011/0280472 A1* | 11/2011 | Wallack | B25J 9/1697 382/153 |
| 2011/0306873 A1* | 12/2011 | Shenai | A61B 34/76 600/424 |
| 2013/0011018 A1* | 1/2013 | Tateno | G06T 7/75 382/106 |
| 2013/0041508 A1* | 2/2013 | Hu | B25J 9/1689 700/259 |
| 2014/0067124 A1* | 3/2014 | Williamson | B25J 9/1653 700/258 |
| 2014/0094951 A1* | 4/2014 | Sasa | B25J 9/1612 700/118 |
| 2015/0120055 A1* | 4/2015 | Miyazawa | B25J 9/1697 700/259 |
| 2015/0283704 A1* | 10/2015 | Watanabe | B25J 9/1697 700/259 |
| 2016/0039096 A1* | 2/2016 | Wallack | B25J 9/1692 702/104 |
| 2016/0059412 A1* | 3/2016 | Oleynik | B25J 3/04 700/257 |
| 2016/0155235 A1* | 6/2016 | Miyatani | G06K 9/036 382/103 |
| 2016/0214255 A1* | 7/2016 | Uhlenbrock | B25J 9/1697 |
| 2018/0004188 A1* | 1/2018 | Yamaguchi | B25J 13/02 |
| 2018/0089831 A1* | 3/2018 | Liu | G06T 7/80 |
| 2018/0126547 A1* | 5/2018 | Corkum | B25J 9/0081 |
| 2018/0297198 A1* | 10/2018 | Dan | B25J 9/1697 |
| 2019/0054617 A1* | 2/2019 | Huang | B29C 65/52 |
| 2019/0073760 A1* | 3/2019 | Wang | B25J 9/1697 |
| 2019/0149802 A1* | 5/2019 | Tanaka | H04N 13/239 348/43 |
| 2019/0184582 A1* | 6/2019 | Namiki | B25J 9/1697 |
| 2019/0193268 A1* | 6/2019 | Tsou | B25J 9/1687 |
| 2019/0291277 A1* | 9/2019 | Oleynik | B25J 9/1669 |
| 2020/0081134 A1* | 3/2020 | Wheeler | G01S 19/393 |
| 2020/0101610 A1* | 4/2020 | Thackston | B25J 9/1697 |

FOREIGN PATENT DOCUMENTS

| | | |
|---|---|---|
| JP | 3415427 | 6/2003 |
| TW | 201403277 | 1/2014 |
| TW | I532575 | 5/2016 |

* cited by examiner

US 11,267,129 B2

AUTOMATIC POSITIONING METHOD AND AUTOMATIC CONTROL DEVICE

CROSS-REFERENCE TO RELATED APPLICATION

This application claims the priority benefit of Taiwan application serial no. 107143046, filed on Nov. 30, 2018. The entirety of the above-mentioned patent application is hereby incorporated by reference herein and made a part of this specification.

BACKGROUND OF THE INVENTION

1. Field of the Invention

The invention relates to automatic control technologies, and in particular, to an automatic control device and an automatic positioning method that may be used to perform automatic correction.

2. Description of Related Art

Since the whole current manufacturing industry develops toward automation, a great number of robotic arms are currently used in automated factories to replace manpower. However, a conventional robotic arm has poor mobility and is inconvenient to deploy, which mainly pursues a speed and precision. Therefore, during replacement or movement of a production line, a lot of time and manpower are required to perform repositioning correction and evaluation. Consequently, the conventional robotic arm cannot be applied to a flexible manufacturing process. In this regard, solutions are proposed in embodiments below to provide an automatic control device that can provide an effective automatic positioning function.

SUMMARY OF THE INVENTION

The invention provides an automatic control device and an automatic positioning method for accurately positioning a robotic arm.

The automatic control device includes a processing unit and a camera unit. The camera unit is coupled to the processing unit. When the processing unit executes a positioning procedure, the processing unit is configured to obtain a first image of the robotic arm. The processing unit obtains a three-dimensional working environment model and first spatial positioning data. The processing unit controls the robotic arm to move a plurality of times to sequentially obtain a plurality of second images of the robotic arm by the camera unit. The processing unit analyzes the plurality of second images and encoder information of the robotic arm to obtain second spatial positioning data. The processing unit determines whether an error parameter between the first spatial positioning data and the second spatial positioning data is less than a specification value to end the positioning procedure.

In an embodiment of the invention, the processing unit analyzes the first image to establish the three-dimensional working environment model and obtain the first spatial positioning data, or another processing unit analyzes the first image to establish the three-dimensional working environment model, obtain the first spatial positioning data, and transmit the three-dimensional working environment model and the first spatial positioning data to the processing unit.

In an embodiment of the invention, when executing the positioning procedure, the processing unit controls the camera unit to move to a position corresponding to the robotic arm, and operates the camera unit to obtain the first image of the robotic arm.

In an embodiment of the invention, after the camera unit is moved to the position corresponding to the robotic arm to obtain the first image of the robotic arm, the processing unit detects a position of the camera unit and receives the first image of the robotic arm from the camera unit.

In an embodiment of the invention, the automatic control device further includes a memory unit. The memory unit is coupled to the processing unit. The memory unit is configured to record a three-dimensional robotic arm model of the robotic arm. The processing unit positions a virtual robotic arm in the three-dimensional working environment model according to the three-dimensional robotic arm model and the three-dimensional working environment model, to obtain the first spatial positioning data.

In an embodiment of the invention, the processing unit corrects the three-dimensional robotic arm model according to the encoder information.

In an embodiment of the invention, the processing unit controls the robotic arm to move at least three times to sequentially obtain at least three second images of the robotic arm by the camera unit.

In an embodiment of the invention, the processing unit respectively analyzes an end feature of the robotic arm in the plurality of second images to position the end feature of the robotic arm and obtain the second positioning data through an inverse kinematics operation.

In an embodiment of the invention, when the processing unit determines that the error parameter between the first spatial positioning data and the second spatial positioning data is not less than the specification value, the processing unit updates the first spatial positioning data according to the second spatial positioning data, re-controls the robotic arm to move a plurality of times to sequentially obtain another plurality of second images of the robotic arm by the camera unit, and performs repositioning.

In an embodiment of the invention, the camera unit is an RGB-D camera, and the first image includes two-dimensional image information and three-dimensional image information.

An automatic positioning method of the invention is applicable to an automatic control device and a robotic arm. The automatic positioning method includes the following steps. A first image of a robotic arm is obtained during execution of a positioning procedure by a camera unit. A three-dimensional working environment model and first spatial positioning data are obtained by a processing unit. The robotic arm is controlled by the processing unit to move a plurality of times to sequentially obtain a plurality of second images of the robotic arm by the camera unit. The plurality of second images and encoder information of the robotic arm are analyzed to obtain second spatial positioning data by the processing unit. Whether an error parameter between the first spatial positioning data and the second spatial positioning data is less than a specification value is determined by the processing unit to end the positioning procedure.

In an embodiment of the invention, the step of obtaining, by the processing unit, the three-dimensional working environment model and the first spatial positioning data includes the following steps. The first image is analyzed by the processing unit to establish the three-dimensional working environment model and obtain the first spatial positioning data. Or the first image is analyzed by another processing unit to establish the three-dimensional working environment model, obtain the first spatial positioning data, and transmit the three-dimensional working environment model and the first spatial positioning data to the processing unit.

In an embodiment of the invention, the step of obtaining, by the camera unit, the first image of the robotic arm includes the following steps. The camera unit is controlled by the processing unit to move to a position corresponding to the robotic arm. The camera unit is operated by the processing unit to obtain the first image of the robotic arm.

In an embodiment of the invention, the step of obtaining, by the camera unit, the first image of the robotic arm includes the following steps. After the camera unit is moved to the position corresponding to the robotic arm to obtain the first image of the robotic arm, the processing unit detects a position of the camera unit and receives the first image of the robotic arm from the camera unit.

In an embodiment of the invention, the step of analyzing, by the processing unit, the first image to establish the three-dimensional working environment model and obtaining the first spatial positioning data includes the following step. A virtual robotic arm is positioned in the three-dimensional working environment model according to a three-dimensional robotic arm model recorded in a memory unit and the three-dimensional working environment model by the processing unit to obtain the first spatial positioning data.

In an embodiment of the invention, the step of analyzing, by the processing unit, the first image to establish the three-dimensional working environment model and obtaining the first spatial positioning data further includes the following step. The three-dimensional robotic arm model is corrected according to the encoder information by the processing unit.

In an embodiment of the invention, the step of controlling, by the processing unit, the robotic arm to move a plurality of times to sequentially obtain the plurality of second images of the robotic arm by the camera unit includes the following step. The robotic arm is controlled to move at least three times by the processing unit to sequentially obtain at least three second images of the robotic arm by the camera unit.

In an embodiment of the invention, the step of analyzing, by the processing unit, the plurality of second images and the encoder information of the robotic arm to obtain the second spatial positioning data includes the following step. An end feature of the robotic arm in the second images is respectively analyzed by the processing unit to position the end feature of the robotic arm, and the second positioning data is obtained through an inverse kinematics operation.

In an embodiment of the invention, the step of determining, by the processing unit, whether the error parameter between the first spatial positioning data and the second spatial positioning data is less than the specification value to end the positioning procedure includes the following steps. When the processing unit determines that the error parameter between the first spatial positioning data and the second spatial positioning data movement is not less than the specification value, the first spatial positioning data is updated according to the second spatial positioning data. The robotic arm is re-controlled by the processing unit to move a plurality of times to sequentially obtain another plurality of second images of the robotic arm by the camera unit, and repositioning is performed.

In an embodiment of the invention, the camera unit is an RGB-D camera, and the first image includes two-dimensional image information and three-dimensional image information.

Based on the above, according to the automatic control device and the automatic positioning method of the invention, the robotic arm may be positioned by means of image analysis to obtain the spatial positioning data of the robotic arm, and the spatial positioning information of the robotic arm may be corrected through an inverse kinematics operation, so as to achieve an accurate positioning effect.

To make the aforementioned more comprehensible, several embodiments accompanied with drawings are described in detail as follows.

DESCRIPTION OF THE EMBODIMENTS

Figure 1:
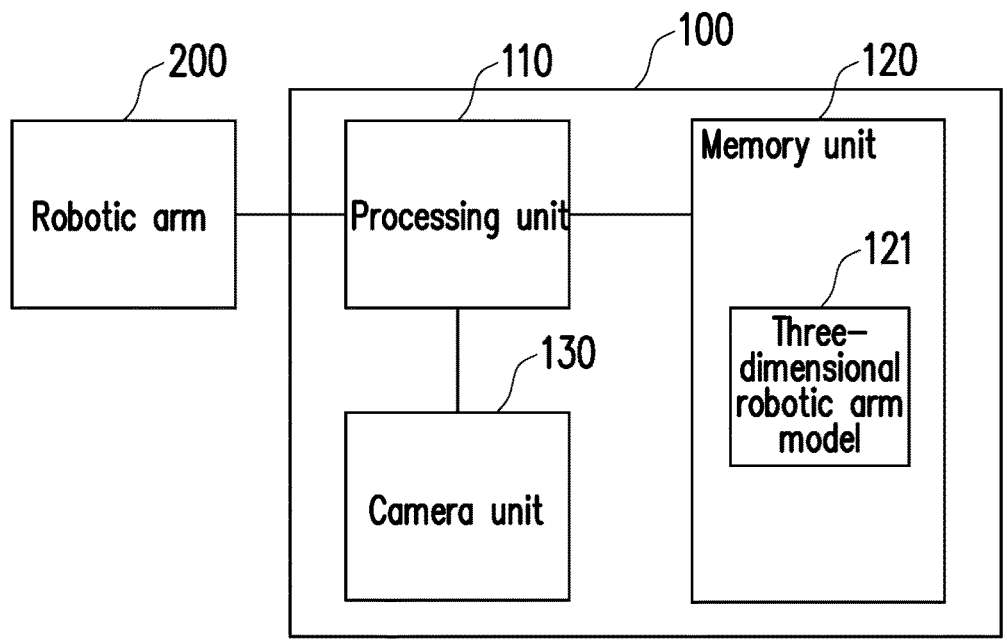
FIG. 1 is a functional block view of an automatic control device according to an embodiment of the invention.

To make the content of the invention more comprehensible, embodiments are described below as examples according to which the invention can indeed be implemented. Wherever possible, the same reference numbers are used in the drawings and the description to refer to the same or like parts, components or steps.

FIG. 1 is a functional block view of an automatic control device according to an embodiment of the invention. Referring to FIG. 1, an automatic control device 100 includes a processing unit 110, a memory unit 120, a robotic arm 200, and a camera unit 130. The processing unit 110 is coupled to the memory unit 120 and the camera unit 130. Moreover, the processing unit 110 of the automatic control device 100 may be coupled to the external robotic arm 200 to control the robotic arm 200. In the present embodiment, the memory unit 120 is configured to record a three-dimensional robotic arm model 121. In the present embodiment, the automatic control device 100 may perform a positioning correction procedure to position the robotic arm 200 by means of image analysis, and obtain first spatial positioning data of the robotic arm 200. In the present embodiment, an operator may record the three-dimensional robotic arm model 121 of the robotic arm into the memory unit 120 in advance. The three-dimensional robotic arm model 121 may be, for example, an input computer aided design (CAD) model, but the invention is not limited thereto. It should be noted that the robotic arm 200 in the present embodiment may be, for example, any type of commercially available industrial robotic arm. An accurate automatic positioning effect and an accurate automatic control effect can be implemented using the automatic control device 100 in the present embodiment.

In the present embodiment, the processing unit 110 may be an image signal processor (ISP), a central processing unit (CPU), a microprocessor, a digital signal processor (DSP), a programmable logic controller (PLC), an application specific integrated circuit (ASIC), a system on chip (SoC), or other similar components or a combination of the foregoing components. No limitation is imposed in the invention.

In the present embodiment, the memory unit 120 may be a dynamic random access memory (DRAM), a flash memory, or a non-volatile random access memory (NVRAM). No limitation is imposed in the invention. The memory unit 120 may be configured to record a three-dimensional model, image data, a control module, various analysis modules, and the like in the embodiments of the invention to be read and performed by the processing unit 110.

In the present embodiment, the robotic arm 200 may be uniaxial or multiaxial, and can seize an object, move an object, and the like. In the present embodiment, the camera unit 130 may be a RGB-D camera, and may be configured to obtain both two-dimensional image information and three-dimensional image information to be provided to the processing unit 110 for analysis, for example, image recognition, depth measurement, robotic arm recognition, positioning processing, or the like, so as to implement an automatic positioning procedure and an automatic positioning method in the embodiments of the invention. In addition, in the present embodiment, the robotic arm 200 and the camera unit 130 are movable. In particular, the camera unit 130 may be mounted on another robotic arm and operated by the processing unit 110, so that the camera unit 130 can automatically follow or automatically search for the robotic arm 200 to obtain one or more images (hereinafter referred to as a first image) of the robotic arm 200. In an embodiment, the camera unit 130 may also be moved by another processing unit or the operator, and the camera unit 130 may be operated by the another processing unit or the operator to obtain the first image of the robotic arm 200.

Figure 2:
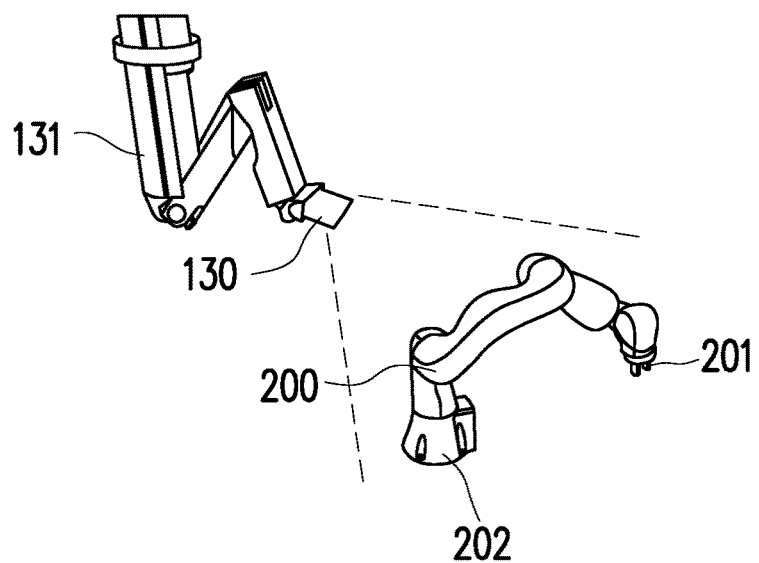
FIG. 2 is a schematic view of an automatic control device according to an embodiment of the invention.

FIG. 2 is a schematic view of an automatic control device according to an embodiment of the invention. Referring to FIG. 1 and FIG. 2, in the present embodiment, when executing a positioning procedure, the automatic control device 100 may first define a spatial position of the camera unit 130. For example, the camera unit 130 may be mounted on another robotic arm 131 or a base, or may be held in hand. The camera unit 130 may determine a spatial position of the camera unit 130 after movement (manual or automatic) based on encoder information on the another robotic arm 131, or may determine the spatial position based on member information of the base or in optical or inertial or other positioning manners. Next, when the camera unit 130 is moved to a position corresponding to the robotic arm 200, the automatic control device 100 may obtain a first image of the robotic arm 200 by the camera unit 130 and analyze the first image by the processing unit 110. In the present embodiment, the first image includes a two-dimensional image and a three-dimensional image. In other words, the processing unit 110 may obtain two-dimensional image information and depth information according to the first image.

In the present embodiment, the processing unit 110 may first analyze a robotic arm image and a working environment image in the first image to establish a three-dimensional working environment model. However, in an embodiment, the three-dimensional working environment model may also be established by an additional external processing unit, and then the additional external processing unit transmits the three-dimensional working environment model to the processing unit 110. That is, the additional external processing unit may detect the position of the camera unit 130 by a sensor or receiving operation data of the another robotic arm 131 and receive the first image of the robotic arm 200 from the camera unit 130, and may analyze the robotic arm image and the working environment image in the first image. In the present embodiment, the three-dimensional working environment model may be a simultaneous localization and mapping (SLAM) model, but the invention is not limited thereto. Next, in the present embodiment, the processing unit 110 may read the memory unit 120 to obtain the three-dimensional robotic arm model 121 corresponding to the robotic arm 200, and read encoder information of the robotic arm 200. The encoder information includes, for example, information such as control program code and a control parameter the robotic arm 200. The processing unit 110 may correct the three-dimensional robotic arm model 121 according to the encoder information of the robotic arm 200, so that the three-dimensional robotic arm model 121 in an original posture may be corrected to a current posture of the robotic arm 200. Moreover, the processing unit 110 combines the corrected three-dimensional robotic arm model with the three-dimensional working environment model to complete information about the three-dimensional working environment model, so as to facilitate positioning. In other words, the processing unit 110 may position a virtual robotic arm in the three-dimensional working environment model according to the three-dimensional robotic arm model and the three-dimensional working environment model, to effectively obtain the first spatial positioning data. It should be noted that, in the present embodiment, the first spatial positioning data refers to a position of an end feature of the virtual robotic arm derived by the processing unit 110 through a forward kinematics operation based on pre-fixed positioning data of a base 202 of the robotic arm 200 and the three-dimensional robotic arm model 121. In the present embodiment, the end feature may refer to a jaw 201 corresponding to the robotic arm 200. Moreover, the forward kinematics operation may be designed based on forward kinematics, but the invention is not limited thereto.

However, in the present embodiment, since there may be an error between the first spatial positioning data obtained through analysis of the three-dimensional working environment model and an actual position of the jaw 201 at an end of the robotic arm 200, in order to further improve accuracy of positioning, the processing unit 110 in the present embodiment may further perform positioning correction. In particular, the processing unit 110 may control the robotic arm 200 to move a plurality of times, and for each movement result of the robotic arm 200, the processing unit 110 may sequentially obtain a plurality of second images of the robotic arm 200 by the camera unit 130. In the present embodiment, the second image is a two-dimensional image, so that the processing unit 110 may obtain two-dimensional image information based on the second image, but the invention is not limited thereto. In an embodiment, the second image may also include both a two-dimensional image and a three-dimensional image. In the present embodiment, the processing unit 110 analyzes an end feature of the robotic arm 200 in the second images and performs an inverse kinematics operation to obtain, as second spatial positioning data, data about the position of the jaw 201 of the end feature corresponding to a movement result of the robotic arm 200. In the present embodiment, the inverse kinematics operation may be designed based on inverse kinematics, but the invention is not limited thereto.

Next, the processing unit 110 derives first spatial positioning data of the robotic arm 200 in the three-dimensional working environment model using the encoder information of the robotic arm 200 and the first spatial positioning data after movement. The processing unit 110 may determine whether a position error between the first spatial positioning data and the second spatial positioning data is less than a specification value after movement. When the position error between the first spatial positioning data and the second spatial positioning data after movement is less than the specification value, it indicates that the robotic arm 200 is accurately positioned, and therefore the processing unit 110 ends the positioning procedure. On the contrary, when the position error between the first spatial positioning data after movement and the second spatial positioning data is not less than the standard value, it indicates that positioning of the robotic arm 200 still has an error. Therefore, the processing unit 110 updates the first spatial positioning data according to the second spatial positioning data, to replace the first spatial positioning data with the second spatial positioning data, and performs repositioning until the robotic arm 200 is accurately positioned. Accordingly, the automatic control device 100 in the present embodiment can accurately position the robotic arm 200.

Figure 3:
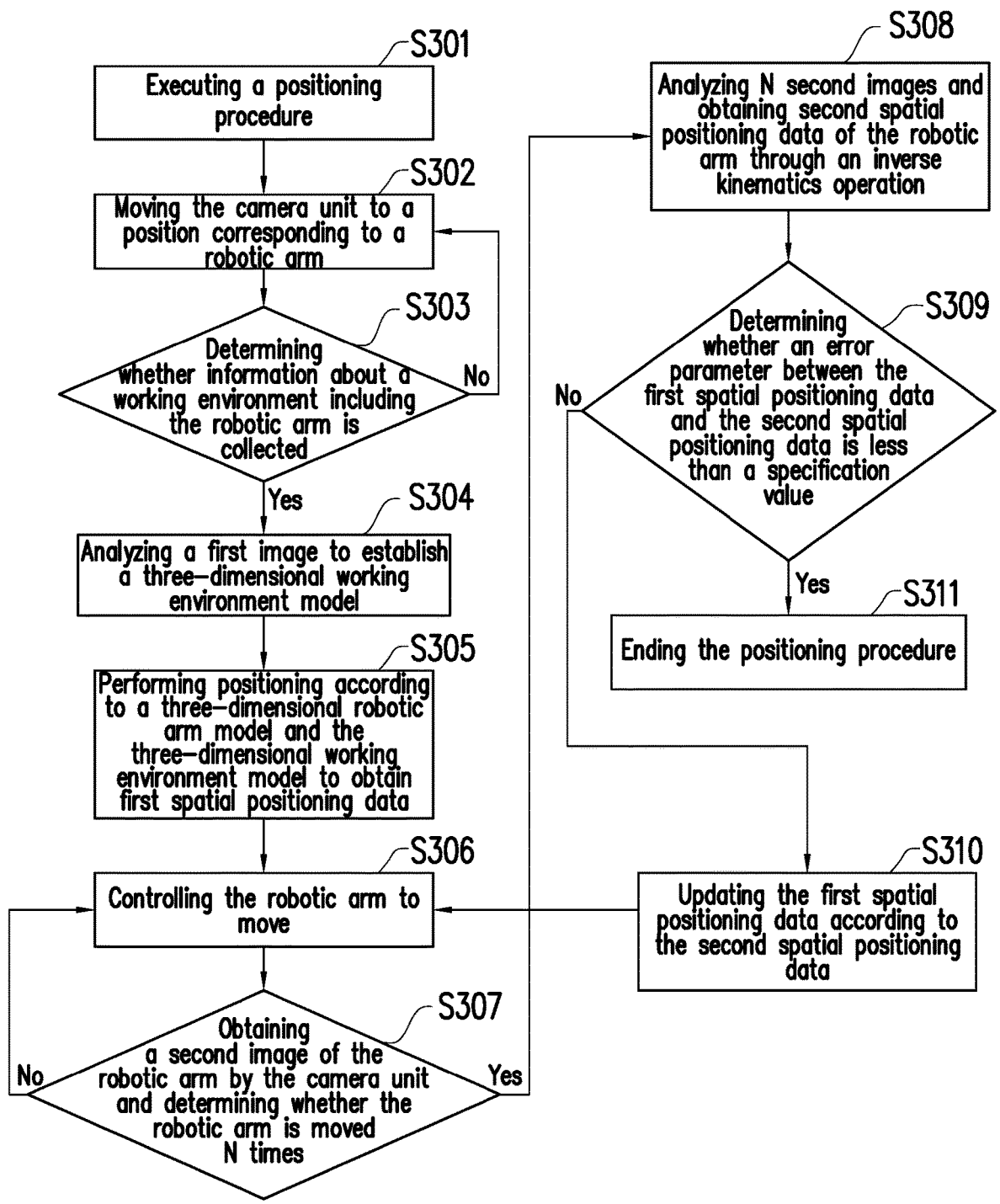
FIG. 3 is a flowchart of an automatic positioning method according to an embodiment of the invention.

FIG. 3 is a flowchart of an automatic positioning method according to an embodiment of the invention. Referring to FIG. 1 to FIG. 3, the automatic positioning method in the present embodiment may be applied to the automatic control device 100 and the robotic arm 200 in the embodiments in FIG. 1 and FIG. 2. In step S301, the processing unit 110 executes a positioning procedure. In step S302, the camera unit 130 is moved to a position corresponding to the robotic arm 200. In the present embodiment, the camera unit 130 is controlled by the processing unit 110 to move to the position corresponding to the robotic arm 200, and then the processing unit 110 operates the camera unit 130 to obtain the first image of the robotic arm 200. However, in an embodiment, the camera unit 130 may also be moved by another processing unit or the operator. After the camera unit 130 is moved to the position corresponding to the robotic arm to obtain the first image of the robotic arm, the processing unit 110 may detect the position of the camera unit 130 and receive the first image of the robotic arm 200 from the camera unit 130. In step S303, it is determined whether information about a working environment including the robotic arm 200 is collected. If no, the processing unit 110 performs step S302 again. If yes, the processing unit performs step S304. In step S304, the processing unit 110 analyzes the first image to establish a three-dimensional working environment model. In step S305, the processing unit 110 performs positioning according to a three-dimensional robotic arm model and the three-dimensional working environment model to obtain first spatial positioning data. In step S306, the processing unit 110 controls the robotic arm 200 to move. In step S307, the processing unit 110 obtains a second image of the robotic arm 200 by the camera unit 130, and determines whether the robotic arm is moved N times, where n is a positive integer greater than or equal to 3. If no, the processing unit 110 performs step S306 again. If yes, the processing unit 110 performs step S308. In step S308, the processing unit 110 analyzes N second images, and obtains the second spatial positioning data of the robotic arm through an inverse kinematics operation. In step S309, the processing unit 110 determines whether an error parameter between the first spatial positioning data and the second spatial positioning data is less than a specification value. If no, the processing unit 110 performs step S310. In step S310, the processing unit 110 updates the first spatial positioning data according to the second spatial positioning data, and performs step 306 again. If yes, the processing unit 110 performs step S311 to end the positioning procedure. Therefore, the automatic control device 100 in the present embodiment can accurately position the robotic arm 200.

Figure 4:
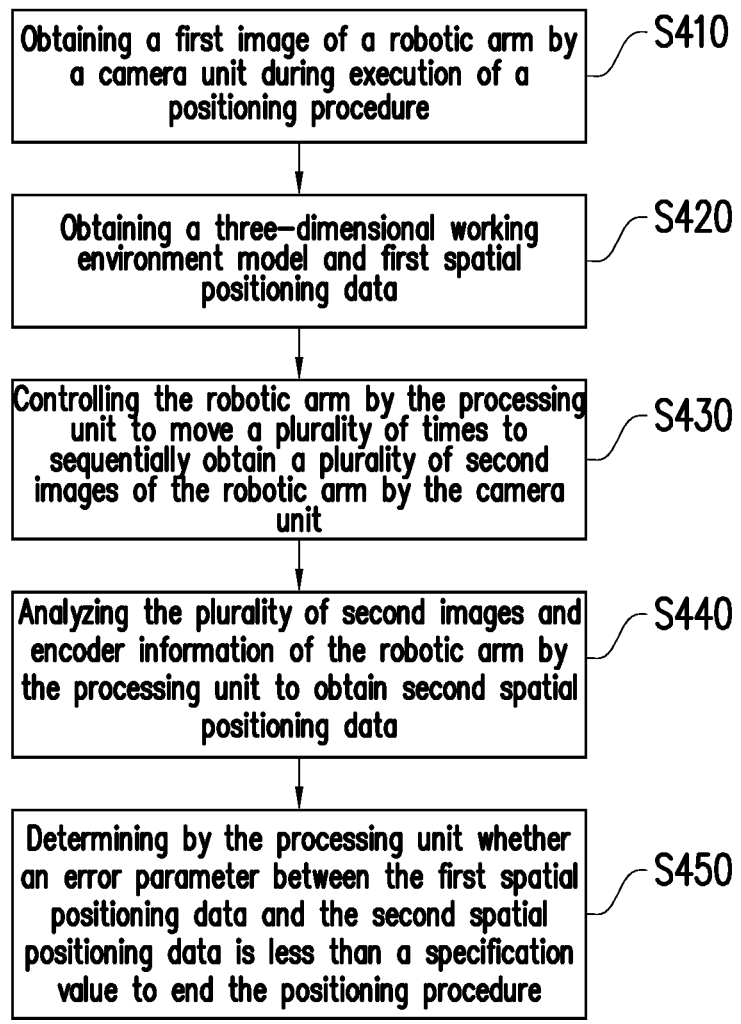
FIG. 4 is a flowchart of an automatic positioning method according to another embodiment of the invention.

FIG. 4 is a flowchart of an automatic positioning method according to an embodiment of the invention. Referring to FIG. 1 to FIG. 4, a process of the automatic positioning method in the present embodiment may be applied to at least the automatic control device 100 in the embodiment in FIG. 1. In step S410, the camera unit 130 obtains a first image of the robotic arm 200 during execution of a positioning procedure. In step S420, the processing unit 110 obtains the first image to establish a three-dimensional working environment model and first spatial positioning data. In step S430, the processing unit 110 controls the robotic arm 200 to move a plurality of times to sequentially obtain a plurality of second images of the robotic arm 200 by the camera unit 130. In step S440, the processing unit 110 analyzes the plurality of second images and encoder information of the robotic arm 200 to obtain second spatial positioning data. In step S450, the processing unit determines whether an error parameter between the first spatial positioning data and the second spatial positioning data is less than a specification value to end the positioning procedure. Therefore, the automatic positioning method in the present embodiment can provide accurate operations for positioning the robotic arm.

In conclusion, according to the automatic control device and the automatic positioning method of the invention, a two-dimensional image and a three-dimensional image of the robotic arm may be taken to establish the three-dimensional working environment model including the robotic arm, and the first spatial positioning data of the robotic arm is obtained using the pre-established robotic arm model. In addition, according to the automatic control device and the automatic positioning method of the invention, a plurality of two-dimensional images may be further obtained after movement of the robotic arm, and the first spatial positioning data is corrected through an inverse kinematics operation. Therefore, the automatic control device and the automatic positioning method of the invention can provide an accurate automatic positioning function and an accurate automatic positioning correction function.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:
1. An automatic control device, comprising:
 a processing unit; and
 a camera unit coupled to the processing unit and configured to obtain a first image of a robotic arm when the processing unit executes a positioning procedure; and
 a memory unit coupled to the processing unit and configured to record a three-dimensional robotic arm model of the robotic arm,
 wherein the processing unit obtains a three-dimensional working environment model and first spatial positioning data;
 wherein the processing unit controls the robotic arm to move a plurality of times to sequentially obtain a plurality of second images of the robotic arm by the camera unit, and the processing unit analyzes the second images and encoder information of the robotic arm to obtain second spatial positioning data; and
 wherein the processing unit determines whether an error parameter between the first spatial positioning data and the second spatial positioning data after movement is less than a specification value to end the positioning procedure, wherein the processing unit positions a virtual robotic arm in the three-dimensional working environment model according to the three-dimensional robotic arm model and the three-dimensional working environment model to obtain the first spatial positioning data.

2. The automatic control device according to claim 1, the processing unit analyzes the first image to establish the three-dimensional working environment model and obtain the first spatial positioning data, or another processing unit analyzes the first image to establish the three-dimensional working environment model, obtain the first spatial positioning data, and transmit the three-dimensional working environment model and the first spatial positioning data to the processing unit.

3. The automatic control device according to claim 1, wherein the processing unit controls the camera unit when the processing unit executes the positioning procedure, so as to move the camera unit to a position corresponding to the robotic arm and operate the camera unit to obtain the first image of the robotic arm.

4. The automatic control device according to claim 1, wherein after the camera unit is moved to the position corresponding to the robotic arm to obtain the first image of the robotic arm, the processing unit detects a position of the camera unit and receives the first image of the robotic arm from the camera unit.

5. The automatic control device according to claim 1, wherein the processing unit corrects the three-dimensional robotic arm model according to the encoder information.

6. The automatic control device according to claim 1, wherein the processing unit controls the robotic arm to move at least three times to sequentially obtain at least three second images of the robotic arm by the camera unit.

7. The automatic control device according to claim 1, wherein the processing unit respectively analyzes an end feature of the robotic arm in the second images to position the end feature of the robotic arm and obtain the second positioning data through an inverse kinematics operation.

8. The automatic control device according to claim 1, wherein, the processing unit updates the first spatial positioning data according to the second spatial positioning data and re-controls the robotic arm to move a plurality of times when the processing unit determines that the error parameter between the first spatial positioning data and the second spatial positioning data is not less than the specification value, so as to sequentially obtain another plurality of second images of the robotic arm by the camera unit and perform repositioning.

9. The automatic control device according to claim 1, wherein the camera unit is an RGB-D camera, and the first image comprises two-dimensional image information and three-dimensional image information.

10. An automatic positioning method applicable to an automatic control device and a robotic arm, wherein the automatic control method comprises:
obtaining, by a camera unit, a first image of a robotic arm during execution of a positioning procedure;
obtaining, by a processing unit, a three-dimensional working environment model and first spatial positioning data;
controlling, by the processing unit, the robotic arm to move a plurality of times to sequentially obtain a plurality of second images of the robotic arm by the camera unit;

analyzing, by the processing unit, the second images and encoder information of the robotic arm to obtain second spatial positioning data; and
determining, by the processing unit, whether an error parameter between the first spatial positioning data and the second spatial positioning data after movement is less than a specification value to end the positioning procedure,
wherein the step of analyzing, by the processing unit, the first image to establish the three-dimensional working environment model and obtaining the first spatial positioning data comprises:
positioning, by the processing unit, a virtual robotic arm in the three-dimensional working environment model according to a three-dimensional robotic arm model recorded in a memory unit and the three-dimensional working environment model to obtain the first spatial positioning data.

11. The automatic positioning method according to claim 10, wherein the step of obtaining, by the processing unit, the three-dimensional working environment model and the first spatial positioning data comprises:
analyzing, by the processing unit, the first image to establish the three-dimensional working environment model and obtain the first spatial positioning data; or
analyzing, by another processing unit, the first image to establish the three-dimensional working environment model, obtain the first spatial positioning data, and transmit the three-dimensional working environment model and the first spatial positioning data to the processing unit.

12. The automatic positioning method according to claim 10, wherein the step of obtaining, by the camera unit, the first image of the robotic arm comprises:
controlling, by the processing unit, the camera unit to move to a position corresponding to the robotic arm; and
operating, by the processing unit, the camera unit to obtain the first image of the robotic arm.

13. The automatic positioning method according to claim 10, wherein the step of obtaining, by the camera unit, the first image of the robotic arm comprises:
after the camera unit is moved to the position corresponding to the robotic arm to obtain the first image of the robotic arm, detecting, by the processing unit, a position of the camera unit; and
receiving, by the processing unit, the first image of the robotic arm from the camera unit.

14. The automatic positioning method according to claim 10, wherein the step of analyzing, by the processing unit, the first image to establish the three-dimensional working environment model and obtaining the first spatial positioning data further comprises:
correcting, by the processing unit, the three-dimensional robotic arm model according to the encoder information.

15. The automatic positioning method according to claim 10, wherein the step of controlling, by the processing unit, the robotic arm to move a plurality of times to sequentially obtain the second images of the robotic arm by the camera unit comprises:
controlling, by the processing unit, the robotic arm to move at least three times to sequentially obtain at least three second images of the robotic arm by the camera unit.

16. The automatic positioning method according to claim 10, wherein the step of analyzing, by the processing unit, the second images and the encoder information of the robotic arm to obtain the second spatial positioning data comprises:
respectively analyzing, by the processing unit, an end feature of the robotic arm in the second images to position the end feature of the robotic arm and obtaining the second positioning data through an inverse kinematics operation.

17. The automatic positioning method according to claim 10, wherein the step of determining, by the processing unit, whether the error parameter between the first spatial positioning data and the second spatial positioning data after movement is less than the specification value to end the positioning procedure comprises:
updating the first spatial positioning data according to the second spatial positioning data when the processing unit determines that the error parameter between the first spatial positioning data and the second spatial positioning data after movement is not less than the specification value; and
re-controlling, by the processing unit, the robotic arm to move a plurality of times to sequentially obtain another plurality of second images of the robotic arm by the camera unit and performing repositioning.

18. The automatic positioning method according to claim 10, wherein the camera unit is an RGB-D camera, and the first image comprises two-dimensional image information and three-dimensional image information.

* * * * *